INVENTOR:
HOWARD L. CROSWHITE
BY
ATTORNEYS.

Aug. 9, 1966

H. L. CROSWHITE 3,265,175

DUAL CAPACITY FLUID PRESSURE OPERATED CLUTCH SERVO

Filed June 28, 1965

INVENTOR:
HOWARD L. CROSWHITE
BY
ATTORNEYS.

United States Patent Office 3,265,175
Patented August 9, 1966

3,265,175
DUAL CAPACITY FLUID PRESSURE OPERATED CLUTCH SERVO
Howard L. Croswhite, Livonia, Mich., assignor to Ford Motor Company, Dearborn, Mich., a corporation of Delaware
Filed June 28, 1965, Ser. No. 470,324
7 Claims. (Cl. 192—87)

This disclosure is a continuation-in-part of my application Serial No. 313,900 filed October 4, 1963 and now abandoned.

My invention relates generally to friction torque establishing devices in the form of clutches or brakes, and more particularly to a friction coupling that is fluid pressure operated to establish a driving connection between two torque transmitting members. My improved structure can be used readily in geared, multiple speed ratio, power transmission mechanisms for establishing and interrupting selectively a driving connection between a power input gear element and a driving shaft. I contemplate, however, that it can be used also to anchor a torque reaction element in a power transmitting driveline.

I am aware of various power transmission mechanisms for automotive vehicle drivelines which include a planetary gear system and pressure operated clutches and brakes for establishing selectively various speed ratios. One such mechanism is disclosed in Patent No. 3,095,755, which is assigned to the assignee of my instant invention. In such mechanisms, a pair of friction clutches and a pair of brakes are employed for controlling the relative motion of planetary gear elements of the gear system to establish speed ratio changes. A first clutch and a first brake are applied simultaneously to establish a first speed ratio, and the same clutch is applied simultaneously with the application of a second brake to establish a second speed ratio. A third speed ratio, which may be a direct drive ratio, is established by engaging both clutches simultaneously as both brakes are released.

Reverse drive is established by releasing the first clutch and engaging the second clutch while simultaneously engaging the first brake. The torque capacity of the second clutch under these reverse drive conditions must be augmented in order to satisfy the reverse drive torque requirements. Thus the second clutch must satisfy two driving conditions, e.g., it must be calibrated to satisfy the torque transmitting requirements for direct drive, high speed ratio operation as well as the torque requirements for reverse drive operation. It is necessary, therefore, to utilize a higher control pressure during reverse drive than the corresponding control pressure that is used during forward drive operation.

If the friction disc elements of the second clutch include a friction material that has a substantially constant coefficient of friction during operation, the capacity of the second brake servo must be augmented still further in comparison to the capacity that would be necessary if the friction material employed were to have a higher coefficient of static friction than its coefficient of dynamic friction.

To provide the necessary capacity increase in an arrangement of this type, I have provided a compound servo mechanism having tandem pressure chambers that can be pressurized selectively depending upon whether the mechanism is conditioned for forward drive operation or reverse drive operation. The pressure that is introduced into one chamber augments the effective pressure introduced into the other during reverse drive operation. But during forward drive operation, only one working pressure chamber is effective.

My improved clutch structure includes also a unique valve arrangement that is used for establishing controlled fluid communication between the working chambers whereby each chamber is subjected to full control pressure when the mechanism is conditioned for reverse drive operation although communication is interrupted when it is conditioned for forward drive operation.

The provision of a clutch structure of the type above set forth being a principal object of my invention, it is a further object of my invention to provide a compound clutch servo having an annular cylinder and a cooperating annular piston wherein the cylinder is provided with a stepped diameter to establish a first working chamber located radially inwardly of a second working chamber, each chamber being sealed so that they are semi-isolated from each other.

It is a further object of my invention to provide a structure of the type above set forth wherein a preloaded valve is employed for establishing controlled communication between the working chambers after the pressure in the first chamber exceeds a precalibrated value.

It is a further object of my invention to provide a structure as set forth in the preceding objects wherein the valve functions also as a sealing element to prevent exhaust of fluid pressure from the working chambers after it is adjusted under the influence of the increased control pressure to a position corresponding to a maximum clutch torque capacity.

It is a further object of my invention to provide an alternate form of my improved clutch structure wherein the valve which controls pressure distribution to the second working chamber is situated for axial movement so that it will not be influenced by inertia forces during operation.

It is a further object of my invention to provide a clutch construction of the type set forth in the foregoing object wherein the valve is controlled by means of a pressure signal that is distributed to it.

For the purpose of describing more particularly the improvements of my invention, reference will be made to the accompanying drawings, wherein.

Figure 1:
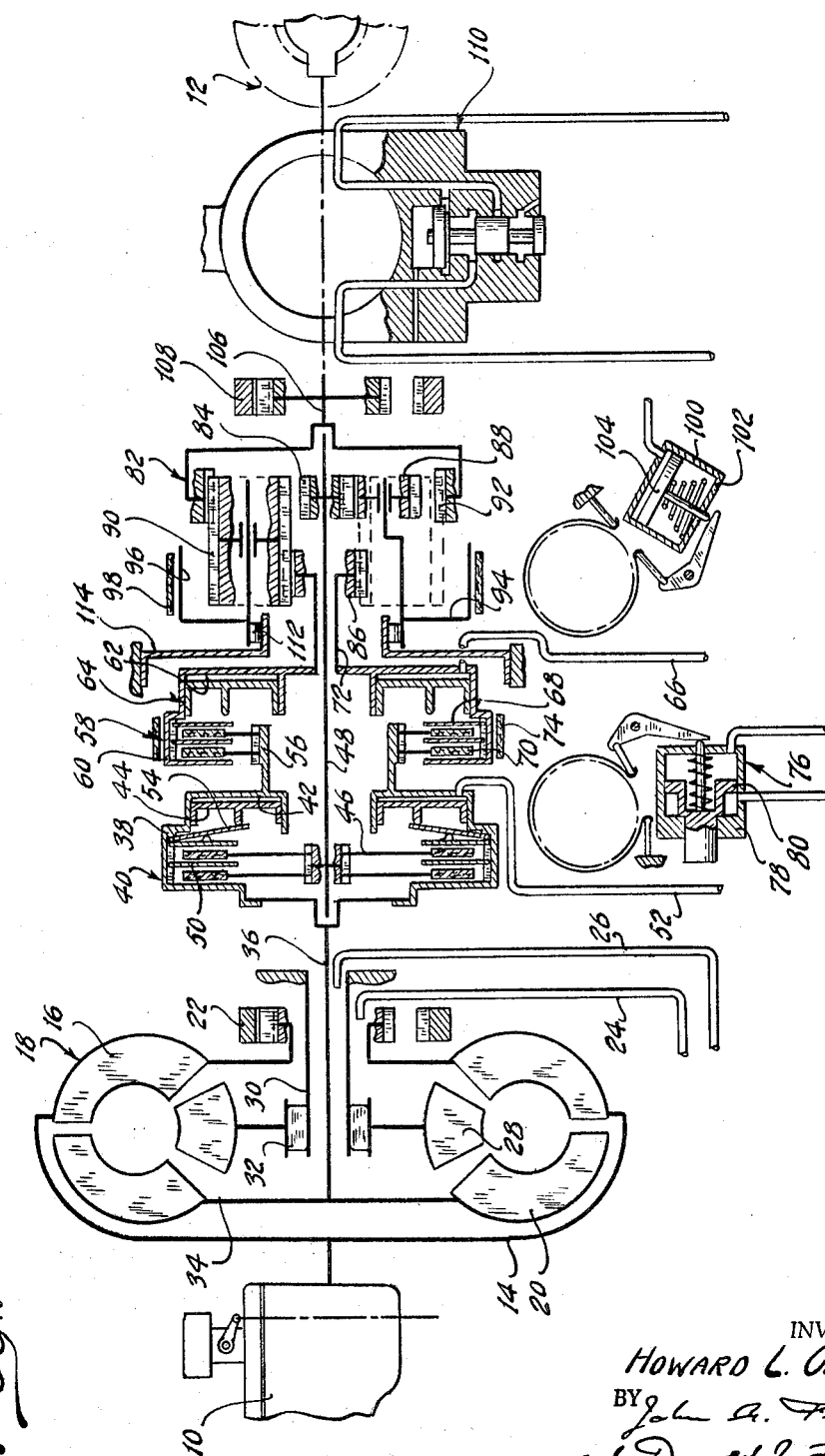
FIGURE 1 shows in schematic form a power transmission mechanism capable of embodying my invention.

Referring first to FIGURE 1, numeral 10 discloses an internal combustion engine for a wheeled vehicle. One vehicle traction wheel is designated generally by reference character 12. The power transmission mechanism of FIGURE 1 is capable of establishing a driving connection between the engine 10 and the traction wheels with any one of three forward drive speed ratios being available.

The engine crankshaft may be connected to a drive plate 14 which is connected to the impeller 16 of a hydrokinetic torque converter unit 18. The unit 18 includes also a bladed turbine 20 situated in juxtaposed fluid flow relationship with respect to the impeller 16. An engine driven pump 22 is coupled drivably to the impeller 16 so that a control pressure may be made available whenever the engine 10 is in operation. The pump 22 supplies control pressure to an automatic control valve system, not shown, the outlet passage for the pump 22 being shown at 24 and the lower pressure inlet passage being shown at 26.

The converter unit 18 includes also a bladed stator 28 situated between the flow exit region of the turbine 20 and the flow entrance region of the impeller 16. The stator 28 is mounted on a stationary stator shaft 30 which is connected to a housing for the transmission mechanism. An overrunning brake 32 is disposed between the stator shaft 30 and the stator 28 to establish a one-way connection therebetween. The stator 28 can rotate relative to shaft 30 in the direction of rotation of the impeller during cruising operation, but rotation in the opposite direction is inhibited during operation in the torque conversion range.

The turbine 20 is connected to a hub 34, which in turn is drivably connected to a turbine shaft 36. This shaft extends axially with respect to the transmission mechanism and is coupled directly to an outer clutch member 38 for a front clutch unit identified generally by reference character 40. Member 38 defines an annular cylinder 42 within which is positioned an annular piston 44. Clutch friction discs 46 connected directly to a power delivery shaft 48 are situated in interdigital relationship with respect to externally splined clutch discs 50 carried by an internally splined portion of member 38. These discs 50 and 46 can be urged into frictional driving relationship as fluid pressure is admitted into cylinder 42 through a control pressure feed passage 52 which forms a part of an automatic control valve system. The pressure force that is developed on the piston 44 is transmitted to the clutch discs through a Belleville spring washer 54, and a driving connection then is established between shaft 36 and shaft 48.

Member 38 is connected also to an inner clutch member 56 for a rear clutch assembly identified generally by reference character 58. This clutch assembly includes an outer clutch member 60 which defines an annular cylinder 62. An annular piston 64 is situated within the cylinder 62 and is moved in a left-hand direction, as viewed in FIGURE 1, as fluid pressure is admitted to the cylinder 62 through the passage 66.

Member 60 carries friction clutch discs 68 which are situated in interdigital relationship with respect to clutch discs 70. These discs 70 are carried by the member 56. Thus as fluid pressure is admitted to the cylinder 62, the discs 70 and 68 are urged into frictional engagement to establish a driving connection between shaft 36 and a sleeve shaft 72, the latter in turn being connected to member 60.

A brake band 74 surrounds a drum portion of the member 60. It may be applied and released selectively by means of the fluid pressure operated servo 76. This servo includes a cylinder 78 within which is situated a double acting piston 80. A pair of working chambers is defined by the piston 80, one chamber being situated on either side thereof. Fluid pressure can be admitted to each chamber by separate fluid pressure feed passages as indicated.

A planetary gear unit is identified generally by reference character 82. It includes a first sun gear 84 and a second sun gear 86. Sun gear 84 drivably engages a first set of planet pinions 88 which in turn engage a second set of planet pinions 90. Pinions 90, in turn, drivably engage a ring gear 92.

Pinions 88 and 90 are journaled for rotation upon a common carrier 94 which defines a brake drum 96. A rear brake band 98, which surrounds a drum 96, may be applied and released by means of a fluid pressure operated brake servo 100. This servo includes a cylinder 102 within which is situated a piston 104. Fluid pressure can be admitted to the cylinder 102 through a suitable pressure feed passage as indicated. The piston 104 is mechanically connected to the brake band 98 by means of a force transmitting linkage mechanism. A similar linkage mechanism is provided to establish a connection between piston 80 and the brake band 74.

Ring gear 92 is connected drivably to a power output shaft 106 which in turn is connected by means of a suitable driveline to the traction wheels 12. A rear pump 108 can be connected drivably to the shaft 106. This pump supplements the action of the front pump 22 and forms a pressure source for the control valve system, not shown. A fluid pressure governor 110 also is connected to the shaft 106 and is centrifugally operated to produce a pressure signal that is utilized by the control system in establishing speed ratio changes.

The action of the brake band 98 is supplemented by an overrunning brake 112 situated between the carrier 94 and a stationary wall 114 which forms a part of the transmission housing. Overrunning brake 112 prevents rotation of the carrier 94 in one direction to establish a torque reaction, but it allows the carrier 94 to freewheel in the opposite direction whenever the brake 98 is released.

To establish first speed ratio operation, it merely is necessary to engage the front clutch 40. Engine torque delivered to the impeller 16 then establishes a hydrokinetic torque flow in the torque converter unit 18. This develops a turbine torque that is delivered through shaft 36 and through the engaged front clutch 40 to the shaft 48. Sun gear 108 thus functions as a power input element and drives the planet pinions 88. These in turn drive pinions 90 which engage ring gear 92, as explained previously. Ring gear 92 thus is driven at a reduced speed ratio.

During this low speed ratio operation, the carrier 94 acts as a reaction member since it is inhibited from rotation by the overrunning brake 112.

Intermediate speed ratio operation is accomplished by applying brake 74 while the front clutch remains applied. This anchors sun gear 86 so that it is capable of acting as a reaction member. Carrier 94 now freewheels in a forward driving direction. Its forward motion augments the motion of the ring gear 92 so that the over-all speed ratio is increased.

Direct drive operation is accomplished by releasing the brake 94 and applying both clutches simultaneously. This locks together the sun gears so that the planetary gear unit rotates in unison. A direct connection then is established between the turbine 20 and the power output shaft 106.

Reverse drive operation is accomplished by engaging simultaneously the rear clutch 58 and the rear brake band 98. Turbine torque then is delivered directly to the sun gear 86. Carrier 94 acts as a reaction member since it is anchored by the brake band 98. Ring gear 92 then is driven in a reverse direction at a reduced speed ratio.

Figure 2:
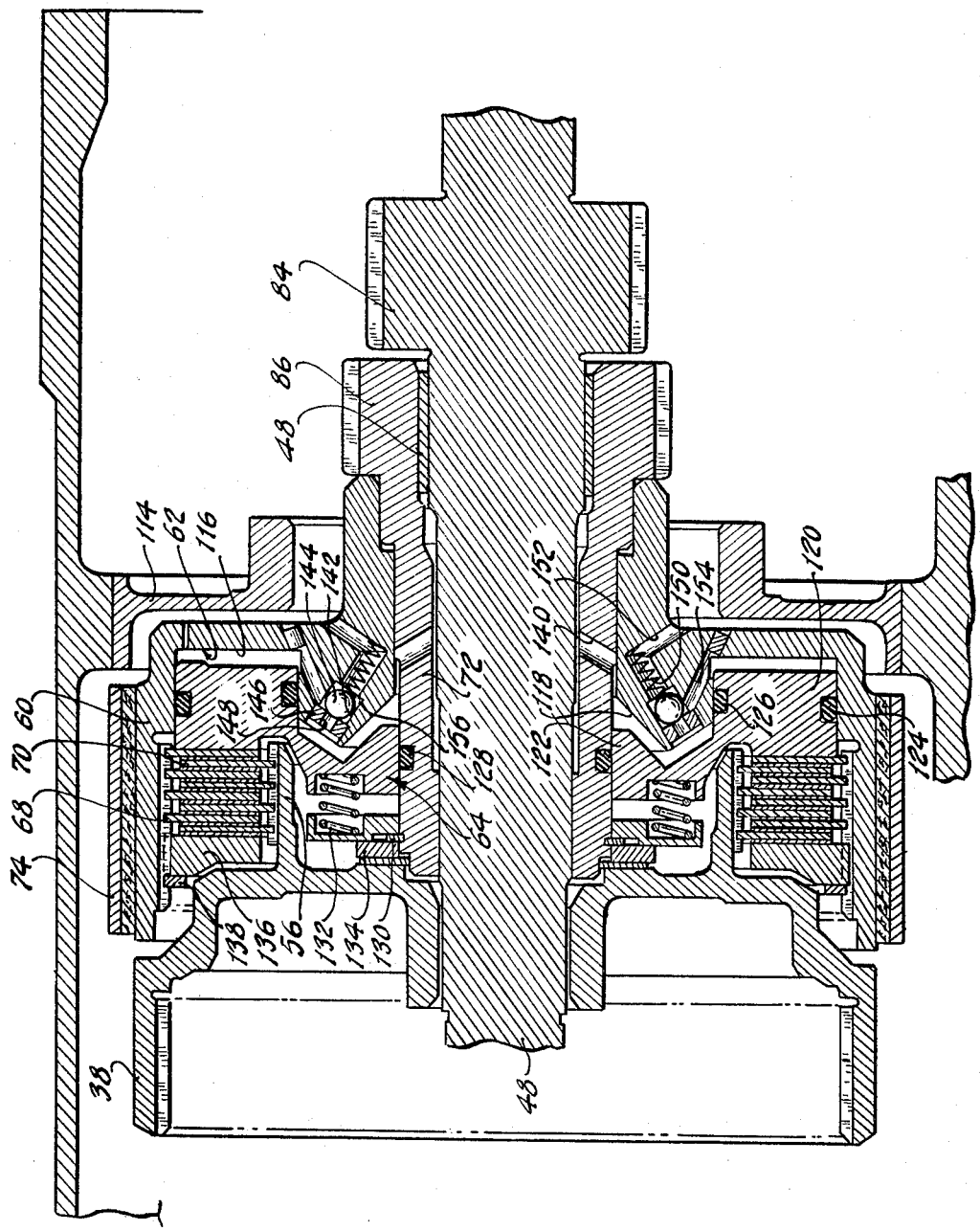
FIGURE 2 shows in cross-sectional form portions of a clutch structure employing my improved servo arrangement.

Referring next to FIGURE 2, it will be seen that the annular cylinder 62 is formed with stepped diameter portions, the first portion being identified by reference character 116 and the second portion being identified by reference character 118. The piston 64 includes two portions that cooperate respectively with the portions 116 and 118. These piston portions are identified separately by reference characters 120 and 122, respectively. Piston portion 120 includes a pair of sealing rings 124 and 126 which seal the working chamber defined in part by the cylinder portion 116. Shaft 72 is formed with an O-ring seal 128 which seals the inner periphery of the piston portion 122. Shaft 72 carries a spring seat 130, and a return spring 132 is situated between it and the piston portion 122. A thrust washer 134 can be provided, if desired, between the clutch member 38 and the shaft 72.

The rear clutch disc assembly includes also a clutch back-up ring 136 which is externally splined to the internally splined periphery of the member 60. It is held axially fast by the snap ring 138.

The pressure feed passage 66 described with reference to FIGURE 1, communicates with a port 140 formed in the shaft 72. This port communicates directly with the working chamber that is defined by the piston portion 122 and the cylinder portion 118. At least one valve chamber 142 communicates also with this working chamber. It includes a first portion within which is sildably positioned a ball valve element 144. One end of the chamber 122 receives an orifice plate 146 within which is formed an orifice 148. The orifice 148 is closed normally by valve element 144 as the latter is urged toward it by a valve spring 150. The other end of the chamber 142 communicates with an exhaust port 152.

An intermediate portion of the chamber 142 communicates with a passage 154 which extends to the working chamber defined by the piston portion 120 and the cylinder portion 116. Thus when the valve element 144 is urged into sealing engagement with orifice plate 146, communication between passage 154 and the radially inward pressure chamber is interrupted. On the other hand, if valve element 144 is moved off from its seat, communication is established between passage 154 and the radially inward pressure chamber.

Valve chamber 142 defines also a second valve seat 156. It is formed at the juncture of the intermediate portion of chamber 142 and the region occupied by the spring 150. As the valve element 144 moves away from the orifice plate 146, it establishes sealing contact with the seat 156, thereby interrupting communication between exhaust port 152 and the working chambers of the cylinder 62.

In a preferred embodiment of my invention, the control pressure that is made available during forward drive operation is regulated at a value that is less than 150 p.s.i. The magnitude of the control pressure is determined by the vehicle speed and by the demand for engine torque. As explained previously, however, provision is made in the automatic control valve system for increasing the magnitude of the line pressure when the mechanism is conditioned for reverse drive operation. In a preferred embodiment, the reverse drive control pressure may be approximately 200 p.s.i.

The spring 150 is capable of maintaining the valve element 144 seated against the orifice plate 146 at any pressure less than 150 p.s.i. As soon as the pressure supplied through port 140 exceeds that value, however, the valve element 144 will move off its seat and establish sealing contact with the seat 156. At the same time, free communication is established between passage 154 and the radially inward pressure chamber. The valve element 144 is maintained in the unseated position by reason of the pressure unbalance that is created as soon as it is seated against the valve seat 156. Thus the pressure that is made available to the radially outward pressure chamber is equal to the maximum control pressure. It is not reduced by reason of the action of the spring 150.

A bleed opening is formed at a radially outward location in the wall of the cylinder portion 116 as indicated in FIGURE 2. This provides an exhaust flow path for the residual fluid in the cylinder portion 116 which will prevent a centrifugal pressure build-up following clutch disengagement. The size of this bleed opening is sufficiently small, however, to prevent any adverse effect upon the clutch engaging time.

Figure 3:
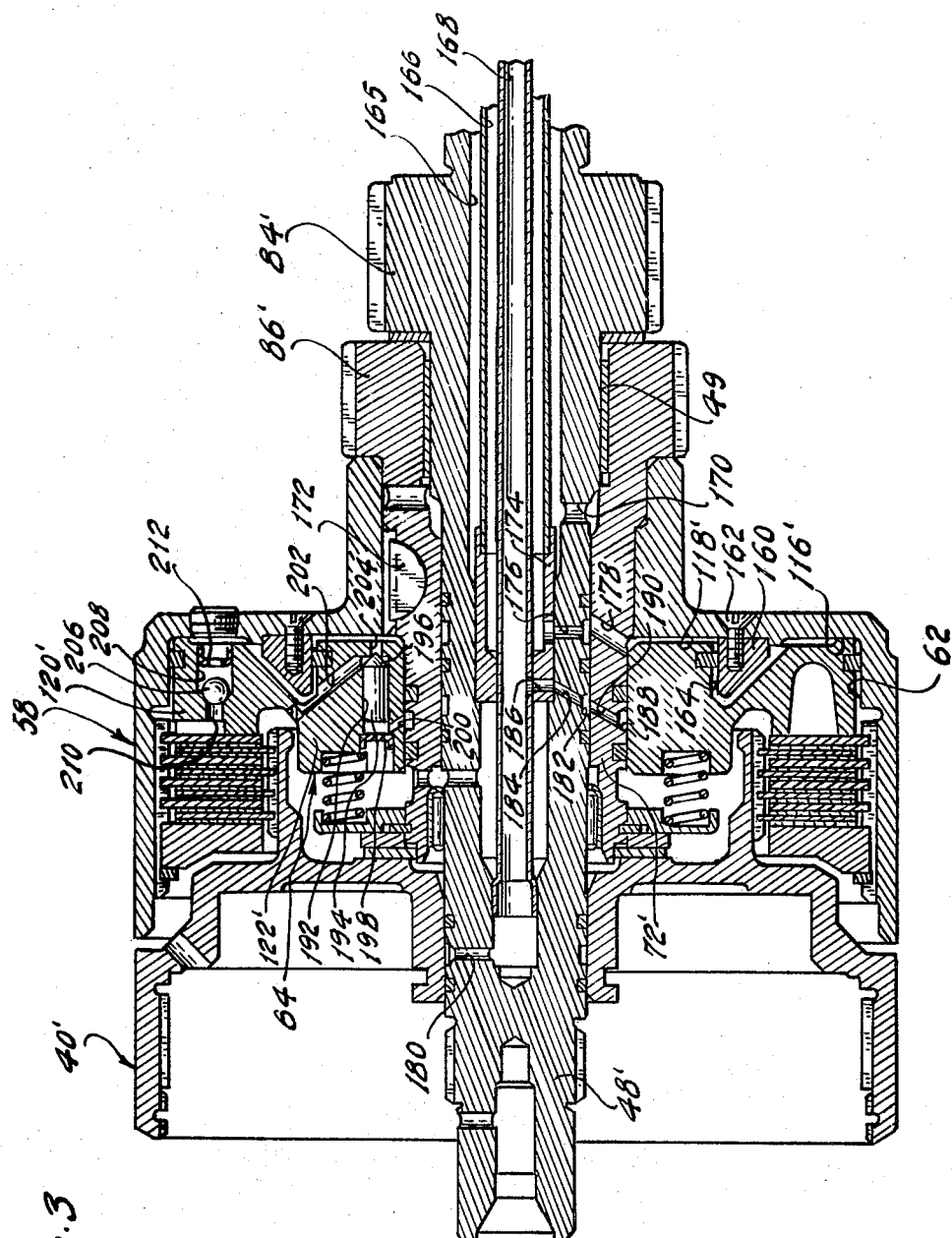
FIGURE 3 shows in cross-sectional form an alternate embodiment of my improved clutch structure and servo arrangement.

In the embodiment shown in FIGURE 3 there is included a clutch structure having tandem working chambers as in the embodiment shown in FIGURE 2. It includes, however, a pressure distribution valve that is situated relatively close to the axis of rotation of the clutch structure and which is adapted for axial movement. It is not influenced by inertia forces and it is triggered by a control pressure signal. Whenever the signal is applied, the valve functions to interrupt communication between the pressure source and the radially outward pressure chamber. When the control signal is exhausted, free communication is established between the two pressure chambers so that each pressure chamber then is in fluid communication with the pressure source.

Many of the elements of the clutch structure of FIGURE 2 have counterpart elements in the embodiment shown in FIGURE 3. These corresponding elements, therefore, have been identified by similar reference characters although primed notations have been added to the numerals used in FIGURE 3.

In the embodiment of FIGURE 3 the annular cylinder 62' is divided into two cylinder portions 116' and 118' by an annular ring 160 which is secured to the interior of the cylinder 62' by screws 162. Ring 160 defines an annular surface 164 which is situated in sealing engagement with the piston portion 122'. This piston portion 122' and piston portion 120' define the compound piston 64'.

The sun gear shaft 48' is formed with a central opening 165. Located in opening 165 is a pair of fluid distributor sleeves 166 and 168. Sleeve 166 cooperates with the opening 165 to define an annular passage through which lubricating oil is distributed to the radially disposed lubrication oil port 170.

Sun gear shaft 72' is keyed to the drum 58 by means of a keyed connection 172. It is journaled on sun gear shaft 48' by bushing 49.

Clutch pressure is distributed through the annular feed passage defined by the concentric sleeves 166 and 168. Each sleeve is received within a stepped diameter by cylindrical insert 174 located in opening 165. The control pressure passage defined by sleeves 166 and 168 communicates with a control pressure port 176 formed in shaft 48'. This in turn communicates with a control pressure port 178 formed in sun gear shaft 72'. This port communicates with the radially inward annular cylinder portion 118'.

A pressure passage also is defined by the sleeve 168. This passage communicates with a radial control pressure port 180 which in turn communicates with a working chamber of the servo for the forward drive clutch 40'. The central passage defined by sleeve 168 communicates also with an annular groove 182 which is in fluid communication with a radial passage 184 formed in sun gear shaft 48' and with a radial passage 186 formed in insert 174. Passage 186 is in continuous communication with a groove 188 through passage 190.

The piston portion 122' is formed with an axially extending valve opening 192. Situated within the valve opening 192 is a single diameter cylindrical valve element 194 which has a conical nose 196. The valve opening 192 is of sufficient length to permit shifting movement of valve element 194 in an axial direction. The left-hand end of the opening 192 is sealed by a closure member 198. The left-hand end of the chamber 192 between the closure member 198 and the element 194 is in continuous communication with annular groove 188 through a passage 200.

A pressure distribution passage 202 provides continuous communication between the cylinder portion 116' and the right-hand end of the valve chamber 192.

The right-hand end of the valve chamber 192 communicates with the cylinder portion 118' through a valve orifice 204. When the valve element 194 assumes the position shown, the conical end 196 registers with the orifice 204 thereby sealing passage 202 from the cylinder portion 118'.

Whenever the front clutch is applied pressure is distributed to the left-hand end of the valve element 194 thereby urging it to a sealing position. Thus when pressure is distributed to the control pressure passage defined by the sleeves 166 and 168, the radially inward cylinder portion 119' is pressurized. But the pressure is prevented from passing to the cylinder portion 116'.

If the front clutch 40' is released, the valve element 194 will be permitted to shift in a left-hand direction. Thus when pressure is distributed to the cylinder portion 118', pressure will be distributed also through orifice 204 and to passage 202 to the radially outward cylinder portion 116'. Thus both pressure chambers become pressurized and the clutch capacity is increased accordingly. It is this condition that exists whenever the mechanism is conditioned for reverse drive operation as explained previously.

To prevent a centrifugal pressure build-up in the residual fluid that may be retained in cylinder portion 116', there is provided a centrifugally operated check valve in the piston portion 120' as indicated at 206. This valve is in the form of a steel ball. It is loosely positioned within a valve opening 208. This opening communicates with an exhaust port 210 formed in the piston portion 120'. A conical valve seat is located at the intersection of the opening 208 and the port 210.

A valve retainer can be provided in the opening 208 as shown at 212. Whenever the radially outward cylinder portion 116' is pressurized, the valve 206 is seated in registry with the port 210. As soon as the control pressure is relieved from cylinder portion 116', the centrifugal force acting upon the ball valve element 206 moves the valve in a radially outward direction over the conical valve seat thereby opening the exhaust port 210. Thus an undesired centrifugal pressure build-up is not obtained when the clutch 58 is rotated at high speeds during forward drive operation or when the transmission is conditioned for neutral.

The valve 194 thus utilizes the front clutch pressure as a control signal and it responds to this control pressure to open and close the orifice 204. It is positioned so that it will not be influenced adversely by centrifugal forces or by other inertia forces during operation.

Having thus described preferred forms of my invention, what I claim and desire to secure by United States Letters Patent is:

1. A fluid pressure operated servo for a friction torque establishing device comprising an annular cylinder, an annular piston positioned within said cylinder and cooperating therewith to define a pair of working chambers, a first friction element connected to said cylinder, a second friction element adjacent the first friction element, said piston being adapted to urge said friction elements into frictional engagement when it is moved in one direction under the influence of fluid pressure, a first control pressure passage communicating with one pressure chamber whereby actuating pressure can be introduced thereto, a second control pressure passage interconnecting said pressure chambers, valve means defining in part said second control pressure passage for interrupting communication between said chambers and responsive to the pressure in said first chamber to establish fluid communication between said chambers when the magnitude of the pressure in said first chamber is greater than a calibrated value, said valve means being adapted to interrupt communication between said chambers when the magnitude of the pressure made available to said first chamber is less than said calibrated value, said valve means comprising a valve chamber located at a radially inward region relative to said radially outward chamber, said second passage including a portion communicating with an intermediate region of said valve chamber, a valve seat situated between said first pressure chamber and said passage portion, a movable valve element engageable with said valve seat, spring means normally urging said valve element against said valve seat to interrupt fluid communication between said chambers, and an exhaust port communicating with the other end of said valve chamber for exposing one side of said valve element to exhaust pressure while the opposite side thereof is exposed to the pressure in said first pressure chamber.

2. A fluid pressure operated friction clutch comprising a first clutch member defining an annular cylinder, an annular piston disposed in said cylinder, a torque delivery clutch element, a first clutch disc carried by said clutch element, a second clutch disc carried by said cylinder adjacent said first clutch disc, said discs being urged into frictional engagement by said piston as fluid pressure is admitted into said cylinder, said cylinder being formed with a stepped diameter and defining separate pressure chambers, a separate portion of said piston being disposed in each cylinder portion, one chamber being located radially outward with respect to the other, a pressure feed passage communicating with the radially inward chamber, a valve chamber formed in said cylinder at a radially inward location relative to the radially outward chamber, a movable valve element disposed in a first portion of said valve chamber, a first valve seat located adjacent one end of said valve chamber with a flow passage formed therein, a branch passage extending from said first valve chamber portion to said radially outward chamber, spring means for biasing said valve element into sealing engagement with said valve seat, and a second valve seat defined by another portion of said valve chamber, said valve element being disposed between said valve seats, said second valve seat defining an exhaust opening whereby said valve element is exposed to a differential pressure when it is moved away from said first valve seat under the influence of pressure in said radially inward chamber.

3. A fluid pressure operated friction clutch comprising a rotary annular clutch cylinder, means for dividing said annular cylinder into a radially outward portion and a radially inward portion, an annular piston having first and second stepped diameter portions situated respectively in said radially inward and radially outward cylinder portions, each cylinder portion and its cooperating piston portion defining a separate pressure cavity, first clutch discs carried by said cylinder portion, other clutch discs carried by another torque delivery element of said clutch in registry with said first clutch discs, said piston engaging said discs to establish frictional driving relationship between said cylinder portion and said other element, a valve chamber in fluid communication with the radially inward pressure cavity, a valve element in said valve chamber adapted to move therein from one axial position to another, a valve orifice establishing communication between the radially inward cavity and one end of said valve chamber, a fluid pressure distributor passage establishing communication between the radially outward cavity and said one end of said valve chamber, means for applying a valve actuating force to said valve element to urge it into registry with said valve orifice and interrupting communication between said pressure chambers, and means for changing the valve actuating force to appropriately change the clutch torgue capacity, the magnitude of the valve actuating force acting upon said valve element to urge it to an orifice closing position being reduced when said radially outward cavity and said radially inward cavity are in fluid communication.

4. In a torque delivery driveline having a driving portion and a driven portion, a torque delivery clutch having one part thereof connected to said driving portion and another part thereof connected to said driven portion, friction discs carried by said clutch parts, an annular cylinder formed by one clutch part, an annular piston situated in said cylinder adjacent said discs and cooperating with said cylinder to define a pair of pressure chambers, one pressure chamber being situated radially outward from the other, a cylindrical valve chamber formed in a radially inward part of said piston and extending generally axially, a cylindrical valve element disposed in said valve chamber and adapted for movement in an axial direction therein, a valve orifice formed in said piston part establishing communication between said valve chamber and the radially inward pressure chamber, a pressure distributor passage connecting one end of said valve chamber and the radially outward pressure chamber, a feed passage means for distributing control pressure to said radially inward pressure chamber, and a signal pressure passage communicating with the other end of said valve chamber and adapted to create a valve actuating force on said valve element to urge it into sealing engagement with said valve orifice thereby interrupting communication between the radially inward pressure chamber and the radially outward pressure chamber of said annular cylinder.

5. In a torque delivery driveline having plural torque delivery gear elements that establish plural torque delivery paths between a driving member and a driven member, a first fluid pressure operated clutch forming in part a torque delivery path through said gear elements during forward drive torque delivery, a second fluid pressure operated clutch forming in part a torque delivery path when engaged through said gear elements during reverse drive operation, said second clutch comprising a drum, a pair of annular cylinders defined by said drum, one cylinder being situated radially outward with respect to the other, an annular piston having radially inward and radially outward portions that are disposed respectively within said radially spaced cylinder portions, friction elements connected to said drum and to said driving member adjacent said piston, a cylindrical valve chamber extending generally axially in the radially inward portion of said piston, a cylindrical valve element disposed in said valve chamber and adapted to move axially therein, a valve orifice formed in said radially inward piston portion and establishing communication between one end of said valve chamber and the radially inward cylinder of said drum, a flow distributor passage extending from said one end of said valve chamber to the radially outward cylinder of said drum, a first feed pressure passage means for distributing fluid pressure to the radially inward cylinder of said drum, a second control pressure feed passage means for distributing fluid pressure to said first clutch, and a signal pressure passage means extending from the other end of said valve chamber to said second feed passage means whereby said valve element is moved to a sealing position whenever said first clutch is engaged.

6. In a torque delivery driveline having a driving portion and a driven portion, a torque delivery clutch having one part thereof connected to said driving portion and another part thereof connected to said driven portion, friction discs carried by said clutch parts, an annular cylinder formed by one clutch part, an annular piston situated in said cylinder adjacent said discs and cooperating with said cylinder to define a pair of pressure chambers, one pressure chamber being situated radially outward from the other, a valve chamber formed in a radially inward part of said torque delivery clutch, a valve element disposed in said valve chamber and adapted for movement in a generally axial direction therein, a valve orifice formed in said radially inward part establishing communication between said valve chamber and the radially inward pressure chamber, a pressure distributor passage connecting one end of said valve chamber and the radially outward pressure chamber, a feed passage means for distributing control pressure to said radially inward pressure chamber, and a signal pressure passage communicating with the other end of said valve chamber and adapted to create a valve actuating force on said valve element to urge it into sealing engagement with said valve orifice thereby interrupting communication between the radially inward pressure chamber and the radially outward pressure chamber of said annular cylinder.

7. In a torque delivery driveline having plural torque delivery gear elements that establish plural torque delivery paths between a driving member and a driven member, a first fluid pressure operated clutch forming in part a torque delivery path through said gear elements during forward drive torque delivery, a second fluid pressure operated clutch forming in part a torque delivery path when engaged through said gear elements during reverse drive operation, said second clutch comprising a drum, a pair of annular cylinders defined by said drum, one cylinder being situated radially outward with respect to the other, an annular piston having radially inward and radially outward portions that are disposed respectively within said radially spaced cylinder portions, friction elements connected to said drum and to said driving member adjacent said piston, a valve chamber in a radially inward portion of said second clutch, a valve element disposed in said valve chamber and adapted to move therein, a valve orifice formed in said radially inward clutch portion and establishing communication between one end of said valve chamber and the radially inward cylinder of said drum, a flow distributor passage extending from said one end of said valve chamber to the radially outward cylinder of said drum, a first feed pressure passage means for distributing fluid pressure to the radially inward cylinder of said drum, a second control pressure feed passage means for distributing fluid pressure to said first clutch, and a signal pressure passage means extending from the other end of said valve chamber to said second feed passage means whereby said valve element is moved to a sealing position whenever said first clutch is engaged.

References Cited by the Examiner

UNITED STATES PATENTS

| 2,916,122 | 12/1959 | Hindmarch | 192—109 X |
| 2,979,176 | 4/1961 | Voth | 192—109 X |
| 3,190,421 | 6/1965 | Schulz | 192—85 |

FOREIGN PATENTS

| 633,985 | 1/1962 | Canada. |
| 564,638 | 10/1944 | Great Britain. |

DAVID J. WILLIAMOWSKY, *Primary Examiner.*

DON A. WAITE, *Examiner.*

B. W. WYCHE III, *Assistant Examiner.*